E. T. WELCOME.
MEANS FOR DEODORIZING AND DRYING NIGHT SOIL AND THE LIKE.
APPLICATION FILED JULY 15, 1908.

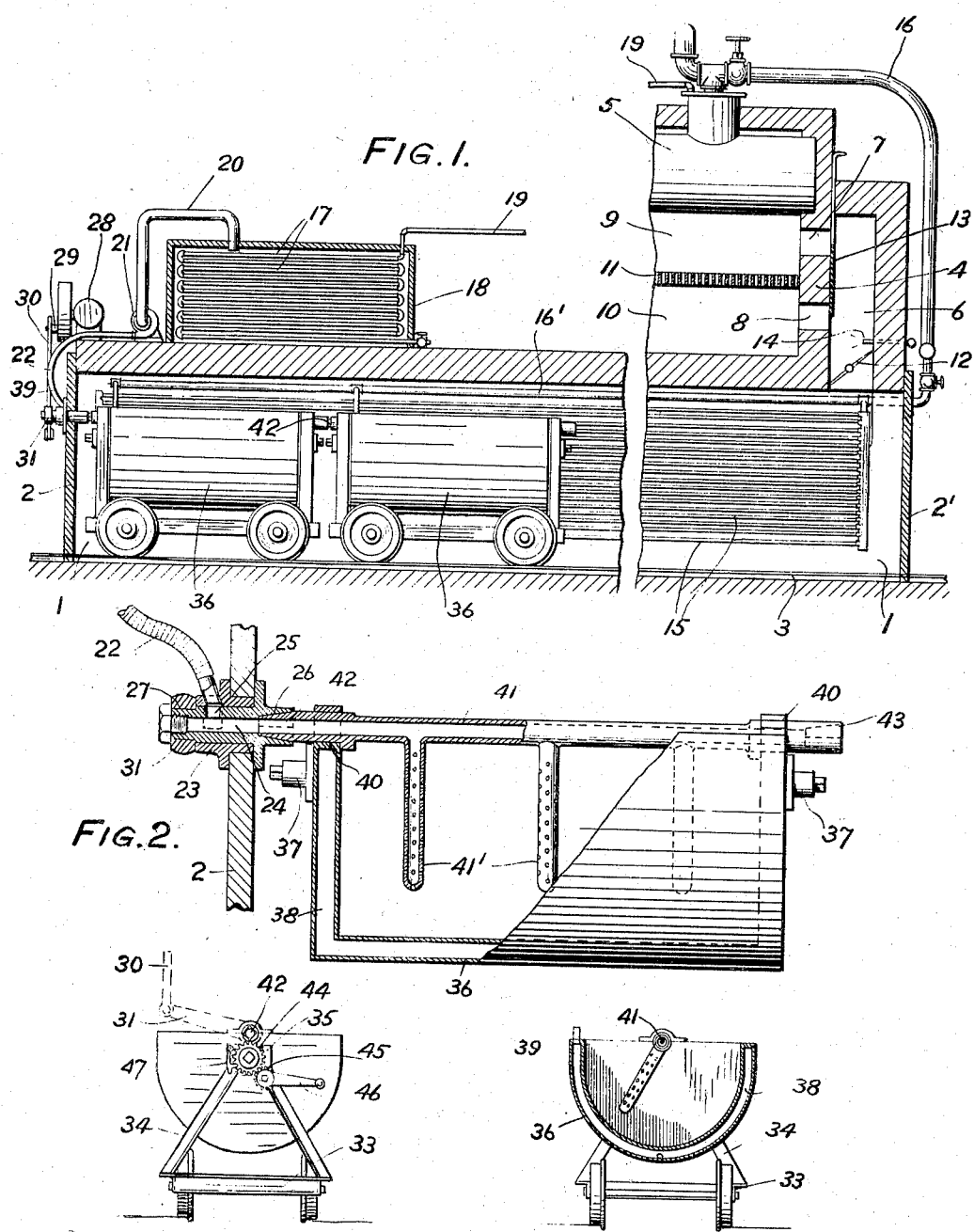

950,977.

Patented Mar. 1, 1910.
2 SHEETS—SHEET 2.

WITNESSES:

INVENTOR
Earnest T. Welcome
BY
Charles N. Butler
ATTORNEY.

UNITED STATES PATENT OFFICE.

EARNEST T. WELCOME, OF PITTSBURG, PENNSYLVANIA.

MEANS FOR DEODORIZING AND DRYING NIGHT-SOIL AND THE LIKE.

950,977. Specification of Letters Patent. Patented Mar. 1, 1910.

Application filed July 15, 1908. Serial No. 443,582.

*To all whom it may concern:*

Be it known that I, EARNEST T. WELCOME, a citizen of the United States, residing in the city of Pittsburg, county of Allegheny, and State of Pennsylvania, have invented certain Means for Deodorizing and Drying Night-Soil and the Like.

This invention provides improved means whereby substances, such as night soil, may be deodorized and dried, by heating, stirring and aerating, and the noxious gases destroyed.

In the preferred operation, the substance to be treated is loaded into cars designed to facilitate the heating, aeration and drying of their contents and the cars so loaded are moved into an oven connected with a furnace which supplies heat for drying the charge and consumes the gases evolved therefrom.

The characteristic features of the invention will fully appear from the following description and the accompanying drawings in illustration thereof.

Figure 5:
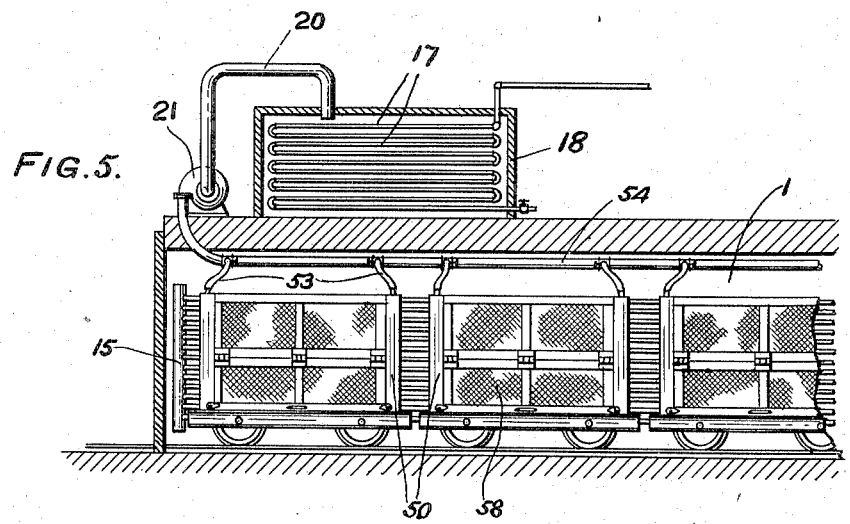
Figure 6:
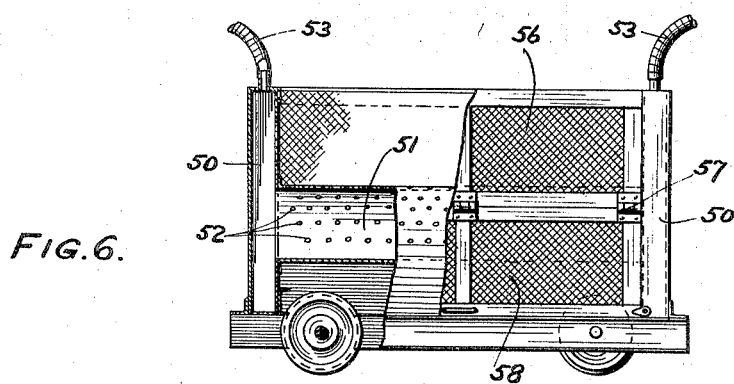
Figure 7:
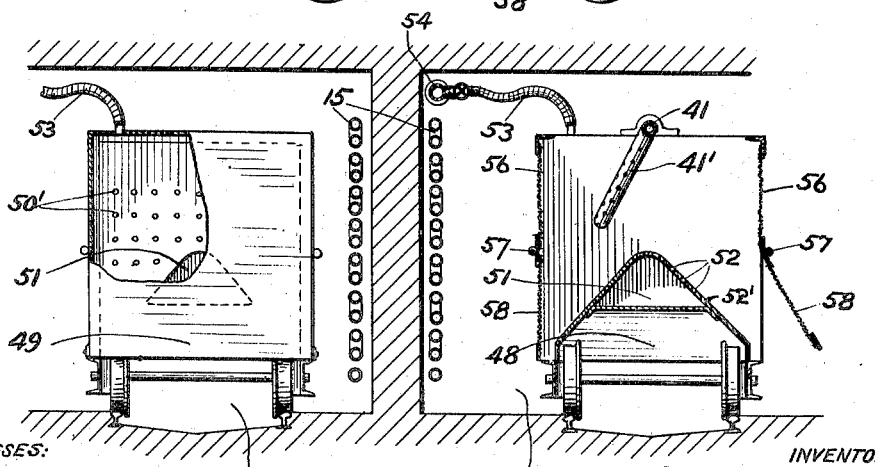

In the drawings, Figure 1 is a sectional elevation illustrating the improvements; Fig. 2 is a sectional elevation of a car body with means for heating, stirring and aerating its contents; Fig. 3 is an end elevation of a car shown in side view in Fig. 1; Fig. 4 is a transverse sectional view of a car shown in end view in Fig. 3; Fig. 5 is a vertical sectional view showing modifications in the invention; Fig. 6 is a sectional side elevation of a car shown in Fig. 5; and Fig. 7 is a broken transverse sectional view illustrating parallel cars in several ovens which may be used.

As shown in Figs. 1 to 4, inclusive, the means which I employ for carrying out my invention comprise an oven 1 having sealing doors 2, 2' and containing the tracks 3. Above the oven is placed a furnace 4 containing a boiler 5. A flue 6 connects the oven 1 through the ports 7 and 8 with the furnace chambers 9 and 10 respectively above and below the grate 11, a valve 12 controlling the passage 6 and a valve 13 controlling the ports 7 and 8. Burners 14, suitably located in the passage 6, may be used to supplement the action of the furnace.

Steam coils 15 for heating the oven are connected by a main conduit 16 with the boiler 5 and steam coils 17 for heating the closed air chamber 18 are connected with the boiler by a conduit 19. A conduit 20 connects the chamber 18 with a fan or blower 21 which is connected by a conduit 22 with a hollow bearing 23 fixed in the door 2. Within this bearing is a hollow journal 24 having a port 25 which communicates with the outlet from the conduit 22, the journal having a tapered socket 26 at the inner end and a hub 27 at the outer end thereof.

A motor 28 has a crank 29 which is connected by a pitman 30 with an arm 31 fixed on the hub 27, whereby the stirring apparatus is oscillated.

Within the ovens are cars comprising the trucks 33, having thereon struts 34 with bearings 35, and bodies 36 having trunnions 37 which are journaled in the bearings 35.

The car body has a double sheet metal wall forming a steam space 38, which may be charged with steam in any suitable manner, as by a connection 39 with the steam pipe 16'.

The ends of the car body are provided with the bearings 40 in which is journaled a hollow shaft 41 having perforated arms 41' disposed within the body, the shaft having the tapered terminus 42 adapted to fit the tapered socket 26 and at the other end a tapered socket 43, adapted to engage a shaft end 42 of a car to be connected therewith, or the socket may be closed when such connection is not desired.

The car has a gear 44 fixed to a trunnion 37, which gear is engaged by a pinion 45 having a handle 46 to dump the body, a pawl 47 engaging the spur gear 44 to hold the body in any desired position.

It will be understood that one or several cars may be run into an oven or ovens of the character described, the ovens sealed, the contents of the car or cars subjected to the heat of the oven supplied by the coils therein and to the heat of the steam introduced into the chamber of the body, the contents of the car stirred by the motor through the mechanism operated thereby, and the substance dried by hot air forced by the fan from the air chamber through the hollow stirrers with their perforated arms. As the cars can be connected automatically by engaging the male terminus of one stirrer shaft with the female terminus of another, so that several shafts may be operated as a unit, and hot air forced through the stirring arms of all simultaneously, it is evident that the contents of several cars may be heated, stirred, and aerated simultaneously. The fumes liberated from the contents of the cars are carried from the ovens into the furnace chambers, either directly or by way of the burners, and thus destroyed.

In the modified construction shown in Figs. 5 to 7 inclusive, parallel ovens 1, provided with steam coils 15 for heating them, contain cars of a modified form. This car comprises a truck 48 which carries a body 49 having end chambers 50 with perforations 50' in the inner walls thereof, the chambers being connected by a longitudinal passage 51 having apertures 52 in its upper ridge shaped wall which forms part of the bottom 52'. The chambers 50 may be coupled by connections 53 with a conduit 54, which is connected through a blower 21 and conduit 20 with the hot air chamber 18 containing the steam coils 17. The car is suitably provided with the perforated side sections 56 having connected thereto by hinges 57 perforated doors 58, the latter being fastened down to close the car and elevated to empty its content, which slides off the ridge shaped bottom. The car may be provided with the stirring apparatus comprising the shaft 41 having the perforated arms 41' operated as previously described. In this construction it will be understood that one or several cars may be run into one or several ovens and hot air forced from the air heating chamber by the blower through the perforations in the walls of the end chambers and those in the wall of the connecting chamber or bottom, the substance in the cars being thus aerated, deodorized and dried, the fumes passing off and being disposed of as previously described.

Having described my invention, I claim:

1. Improvements of the character described comprising a furnace, an oven communicating therewith, in said oven a car having a heating chamber, and means for aerating the contents of said car.

2. Improvements of the character described comprising a furnace, an oven connected with said furnace, a car in said oven, stirring apparatus in said car, and means for operating said stirring apparatus.

3. Improvements of the character described comprising a furnace, an oven connected with said furnace, a car in said oven, a stirring appartus in said car, means for operating said stirring apparatus, and means for introducing air thereby to the contents of said car.

4. Improvements of the character described comprising a furnace, an oven connected with said furnace, several cars in said oven, each of said cars having a chamber or chambers communicating with the car's interior, and means for forcing air through said chambers.

5. Improvements of the character described comprising a furnace, a boiler heated thereby, a closed chamber, coils in said chamber connected with and heated by means of said boiler, a second chamber, a receptacle in said second chamber, means for conveying heated air from said first chamber and applying it to the contents of said receptacle in said second chamber, and means for passing gases from said second chamber to said furnace.

6. Improvements of the character described comprising a furnace, a boiler, a chamber, steam pipes in said chamber connected with and heated by said boiler, a second chamber, a conduit for conveying gases from said second chamber to said furnace, a receptacle in said second chamber, and means comprising a conduit for connecting said first chamber with said receptacle and distributing heated air to the contents thereof.

In witness whereof I have hereunto set my name this 10th day of July, A. D. 1908, in the presence of the subscribing witnesses.

EARNEST T. WELCOME.

Witnesses:
ROBERT JAMES EARLEY,
JOS. G. DENNY, Jr.